2,582,525

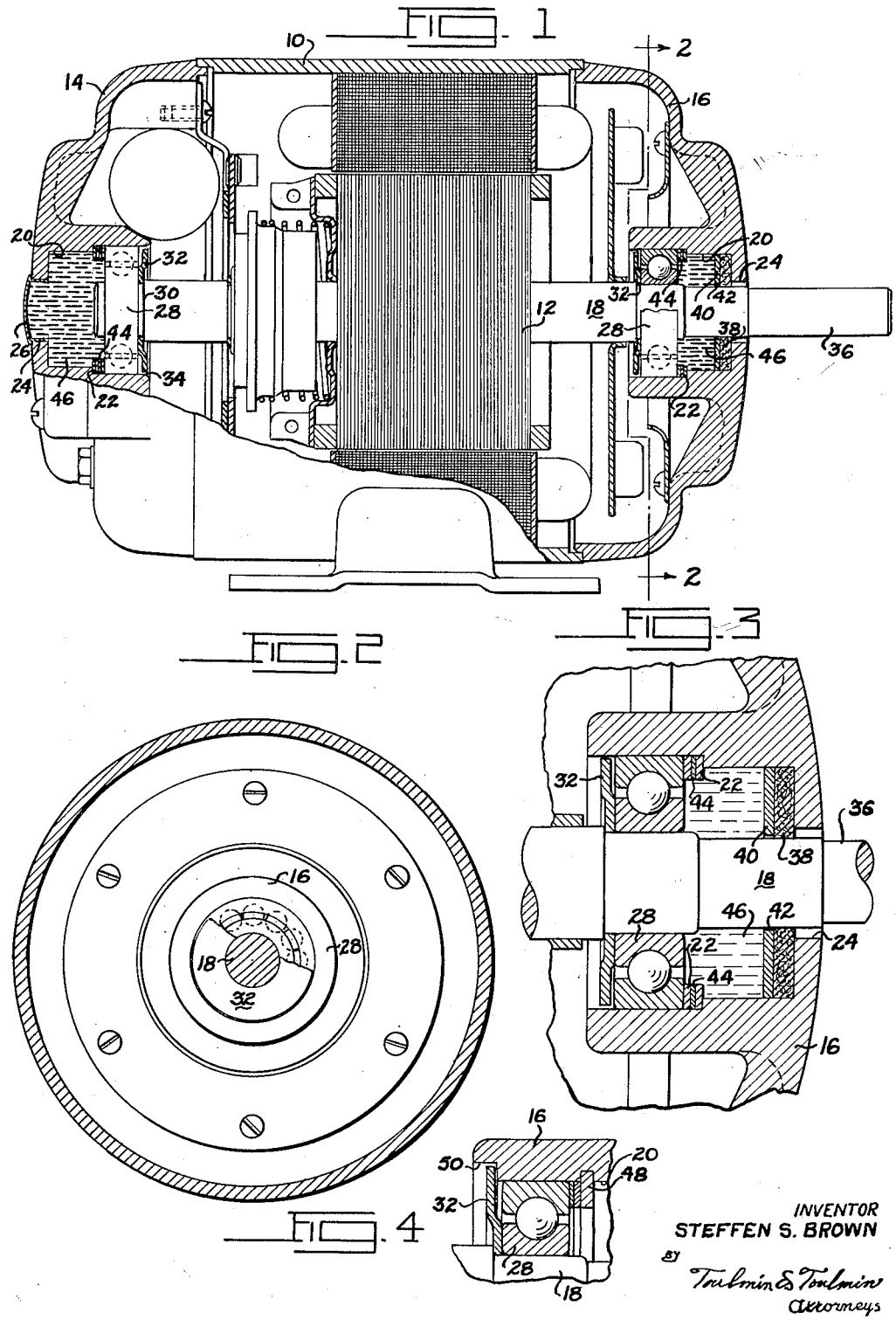
Jan. 15, 1952   S. S. BROWN   2,582,525
SHAFT SEAL
Filed Jan. 19, 1948
INVENTOR
STEFFEN S. BROWN
BY
Toulmin & Toulmin
Attorneys Patented Jan. 15, 1952

UNITED STATES PATENT OFFICE 2,582,525

SHAFT SEAL

Steffen S. Brown, Dayton, Ohio, assignor to The Brown-Brockmeyer Co., Dayton, Ohio, a corporation of Ohio Application January 19, 1948, Serial No. 3,152

8 Claims. (Cl. 308—187.1)

1

This invention relates to shaft seals, and particularly to such seals in connection with the retention of grease and similar lubricants in a bearing cavity.

In many types of industrial equipment, particularly electric motors, the lubricating of the bearings is a critical factor in determining the length of useful life of the said equipment.

In the case of electric motors the lubricating of the bearings is not only critical due to the fact that such motors are utilized in locations wherein the temperature varies widely and under widely varying conditions of load, but also because many times the motor is difficult to reach in order properly to supply lubricants to the bearings thereof.

Due to the aforementioned varying conditions of usage of such devices and to counteract careless practices by workmen or the use of improper lubricants, some of the equipment of this nature has been equipped with anti-friction bearings which are permanently lubricated by a body of grease or similar lubricant which is placed in the bearing at the time of manufacture.

While this manner of providing for lubrication of the bearing is satisfactory for many purposes, it is lacking in adequately lubricating electric motor bearings under all possible conditions of usage thereof due to the small amount of lubricant which can be so placed in a bearing. Bearing failures are apt to occur in electric motors because of this when the bearing is overloaded or is running hot and the said lubricant thins out.

According to this invention bearing installations for rotating shafts, especially in connection with electric motors, are arranged so as to be substantially completely and permanently sealed and including a sufficient supply of lubricant adequately to lubricate the bearing throughout its useful life even under extreme conditions of usage.

The primary object of this invention is therefore to provide an improved bearing arrangement for rotating members such as the shafts of electric motors.

Another object is to provide an arrangement for an anti-friction bearing mounted on a shaft of a rotating device such as an electric motor in which there is an adequate supply of lubricant for the bearing to lubricate it substantially throughout its life.

2

A still further object is the provision of a bearing compartment for the anti-friction bearing of a rotating element wherein sealing means is provided for excluding foreign material from the bearing while retaining the lubricant supply in the bearing cavity.

A still further object is the provision of a grease seal arrangement for the anti-friction bearing of a rotating shaft which is easy to construct and which does not require excessively accurate machining of the parts.

A still further object is the provision of a grease seal arrangement for anti-friction bearings which operates efficiently with ordinary machine fits and which is economical to manufacture and simple to assemble.

These and other objects and advantages will become more apparent upon reference to the following description taken in connection with the accompanying drawings in which:

Figure 1 is a view of an electric motor partially in section and showing anti-friction bearings for the shaft arrangement with a grease compartment and seal according to this invention;

Figure 2 is a transverse section indicated by the line 2—2 on Figure 1 and showing detail construction of the motor;

Figure 3 is an enlarged view showing the lubricant chamber and sealing arrangement at the drive shaft end of the motor; and Figure 4 is a fragmentary view similar to Figure 3 and showing a somewhat modified arrangement.

Referring to the drawings, Figure 1 shows a rotating mechanism comprising a stationary part 10 and a rotating part 12. The stationary part 10 has the end members 14 and 16 and the rotary part has a supporting shaft 18.

The device illustrated in the drawings is an electric motor, but it will be understood that this invention is applicable to any number of devices which have stationary members and rotating parts.

Each of the end covers 14 and 16 comprises a cavity 20 into which the shaft 18 extends. Referring to the cavity 20 associated with the end cover 14 this will be seen to comprise a shouldered recess, the said shoulder being indicated at 22, and having an aperture 24 opening through the cover. Since the shaft 18 does not extend through the cover 14 the aperture 24 is closed by a dust cap 26, and for the purposes of this invention it may be considered that the aperture is completely and permanently closed.

In the larger part of the cavity 20 there is the anti-friction bearing 28 which is pressed or otherwise suitably affixed to the end of the shaft 18. The outside diameter of the said bearing is preferably a close slip fit in the larger part of the cavity 20 and is thus supported thereby to locate the rotating part 12 in the radial direction.

Adjacent the bearing 28 there is a shoulder 30 on the shaft 18 and clamped between the said bearing and the said shoulder is an annular disc member or washer 32. This washer projects radially outward from the shaft and has a close running fit with the recess 20 adjacent the mouth thereof as at 34.

Referring to the recess in the end cover 16 this will be seen to be substantially identical in arrangement to that in the end cover 14. Accordingly, corresponding numerals are applied to the arrangement in the end cover 16 for corresponding parts. In the end cover 16, however, the shaft 18 is extended so as to have a part 36 projecting through the end cover for connection with a pulley or drive gear or the like. Accordingly, the aperture 24 in the cover 16 is not closed and provision must be made to prevent lubricant from escaping through the aperture or dirt from entering the cavity 20. To this end there is a relatively thick felt washer 38 which rests in the bottom of the cavity 20 in the cover 16 and which fits closely around the shaft 18. This felt washer is retained in position by a stiff washer of fiber like material or similar substance as at 40. The washer 40 has a clearance around the shaft as at 42 but is a close fit within the recess 20. When the washer 40 is pressed into the recess and against the felt washer 38 it will retain the said washer permanently in position.

In the case of an electric motor it is desirable that the iron part of the rotor be axially aligned with the iron part of the stator in order to provide for the most efficient operation of the motor and to eliminate end thrust on the rotor.

Accordingly, between each of the bearings 28 and the adjacent shoulder 22 in the recess in which the bearing is mounted there are placed the shims 44 which axially locate the bearings and the shaft and the rotating parts of the device carried by the shaft. It is understood that these shims are relatively thin washer-like members and are generally placed in the end covers when the motor is assembled and are adjusted as is necessary in order to bring about alignment of the iron of the motor.

Reference to the drawings will reveal that the shoulders 22 also provide abutments which stop the bearings 28 in a position substantially spaced from the bottoms of the recesses. These spaces are indicated at 46 and provide lubricant chambers of substantial size which are filled with a lubricating substance such as grease at the time the motor is assembled. It will be apparent from the drawings that these spaces have sufficient capacity to retain therein a large quantity of grease so that the bearings are assured of adequate lubrication for a long period of operation.

It will also be evident that the felt-like washer 38 operates to retain the grease in the associated cavity so that it can not leak therefrom along the shaft 18 and, similarly, the said washer prevents the entrance of dirt and other foreign matter into the said cavity which would detract from the lubricating qualities of the grease.

At the same time the slingers or centrifugal members 32 operate to prevent leakage of grease through the bearing and outside the cavities on the inside of the end covers. This is due to the fact that the said slingers have a close running fit or clearance with the cavities 20 and adjacent the mouths thereof. Due to this close running clearance, when grease leaks through the bearings and is thrown outwardly by the slingers, it will build up around the walls of the cavities and form highly efficient fluid like seals which will at one time inhibit further leakage of grease from the cavities and substantially positively prevent the entrance of any foreign material therein.

One of the advantages of the instant invention is that there is no critical machining operation to be performed. So long as the larger part of the cavities 20 provides a good sliding fit with the bearings 28 and the smaller part of the cavity and the aperture in the cover 16 are approximately co-axial with the said larger part, the grease seal of this invention will operate with satisfactory efficiency. This is due to the fact that the close fit of the felt washer around the shaft causes the said washer to align itself with the shaft and thus to maintain a close engagement therewith completely around the periphery of the shaft. Due to the close fit of the felt washer around the shaft the clearance at 42 between the shaft and the fiber washer 40 may be provided and this combination of circumstances permits considerable latitude in the machining of the recess.

While the recesses 20 have been shown with shoulders therein, it will be evident that this shoulder is essentially an abutment and may be provided in other manners. For example, in Figure 4 the recess 20 is a straight cylindrical cavity and an abutment is provided therein by means of a snap ring 48 which is snapped into a groove machined at the proper axial point around the wall of the cavity.

Similarly, the essential feature in connection with the slingers 32 is that they have a close running clearance relative to the mouth of the cavity. Thus, if it is necessary or desirable to provide a more positive sealing arrangement at the cavity mouth, the recess could be counterbored as indicated at 50 in Figure 4 and the slinger 32 extended radially as illustrated. This would give a relatively long thin passage through which the grease would have to pass to get out of the recess and at the same time provide a long passage through which the dirt would have to pass in entering the recess. The sealing action would thus be very efficient.

It will be understood that this invention is susceptible to modification in order to adapt it to different usages and conditions and, accordingly, it is desired to comprehend such modifications within this invention as may fall within the scope of the appended claims.

I claim:

1. In an electric motor having a stator and a rotor; an end cover for said stator having an aperture therein, a shaft for said rotor extending through said aperture, a boss on the inside of said cover surrounding said shaft and a shouldered recess therein in axial alignment with said aperture, a felt washer closely surrounding said shaft and disposed in the bottom of said recess to engage said shaft adjacent said aperture, a stiff washer press fitted into said recess and loosely surrounding said shaft, said washers being axially spaced toward the outside of said cover from the shoulder in said recess to define a lubricant cavity, a shoulder on said shaft axially spaced from the shoulder on said recess in the opposite direction, an anti-friction bearing on said shaft between said shoulders, a metal washer on said shaft between the shoulder thereon and said bearing and having close clearance with the wall of the larger part of said recess and projecting beyond that portion of the wall supporting the race of said bearing, and shims placed between said bearing and the shoulder in said recess to fill the space therebetween.

2. In a motor having a stationary part and a rotary part therein, an end cover for said stationary part having an aperture therein and a shaft for said rotary part substantially in axial alignment with said aperture and extending therethrough, a shouldered recess on the inside of said cover surrounding said shaft and substantially co-axial with said shaft and aperture, a felt washer closely fitting said shaft and in the bottom of said recess, a stiff washer press fitted into said recess and holding said felt washer in position, said washers being spaced from the shoulder in said recess to define a lubricant cavity, a shoulder on said shaft spaced from the shoulder in said recess on the side opposite said washers, a metal washer on said shaft against the shoulder thereon and having a close running clearance with the wall of said recess and projecting beyond that portion of the wall supporting the race of said bearing, an anti-friction bearing fitted on said shaft against the washer thereon and closely fitting said recess, and shims between said bearing and the shoulder in said recess.

3. In combination; a stationary member and a rotary member therein, an end cover for said stationary member and a shaft for said rotary member extending through said cover, a recess on the inside of said cover co-axial with and surrounding said shaft, a resilient washer in the bottom of said recess closely fitting said shaft and having substantial thickness so as to serve as a lubricant seal around said shaft, a stiff washer member in said recess retaining said resilient washer in position and having clearance around said shaft, an abutment in said recess spaced inwardly of said cover from said washers, a shoulder on said shaft spaced inwardly of said abutment, an anti-friction bearing on said shaft between said shoulder and abutment, shim means between said abutment and bearing, and a grease slinger clamped on said shaft between said shoulder and bearing and having a close running clearance with the wall of said recess and projecting beyond that portion of the wall supporting the race of said bearing.

4. In a seal for sealing between a shaft and a stationary member, walls of said stationary member forming a recess therein surrounding said shaft and having an aperture in the bottom thereof to receive said shaft therethrough, a thick felt-like washer closely fitting said shaft and means to retain said washer in the bottom of the recess, an anti-friction bearing on said shaft closely fitting said walls of said recess and axially spaced from said washer to define a lubricant chamber, and a flat disc member mounted on said shaft adjacent said bearing on the side opposite the said washer and having a close running fit with the wall of said recess and projecting beyond that portion of the wall supporting the race of said bearing.

5. In a seal for sealing between a shaft and a stationary member, walls of said stationary member forming a recess therein surrounding said shaft and having an aperture in the bottom thereof to receive said shaft therethrough, a thick felt-like washer closely fitting said shaft and means to retain said washer in the bottom of the recess, an anti-friction bearing on said shaft closely fitting said walls of said recess and axially spaced from said washer to define a lubricant chamber, a flat disc member mounted on said shaft adjacent said bearing on the side opposite the said washer and having a close running fit with the wall of said recess and projecting beyond that portion of the wall supporting the race of said bearing, and an abutment in said recess abutting said bearing on the washer side thereof.

6. In combination; a frame comprising spaced end parts having cavities therein facing each other, a shaft extending between said cavities, antifriction bearings on said shaft in said cavities, abutments in said cavities whereby shims can be placed between the bearings and abutments and thereby axially position said shaft, and slingers comprising disc washers on said shaft rotatably secured in contact with said bearings and said abutment between the same and extending radially towards said frame on the side of said bearings opposite said abutments and having close running clearance with the mouths of said cavities, the space between said abutments and the bottoms of said cavities acting as a closed lubricant reservoir for said bearings.

7. In combination; a frame comprising spaced end parts and each having walls forming cavities therein facing each other, a shaft extending between said cavities, anti-friction bearings on said shaft in each of said cavities, abutments in the walls of said cavities, shims placed between the bearings and abutments thereby axially positioning said shaft, and slingers comprising disc washers on said shaft rotatably secured in contact with said bearings and said abutment between the same and extending radially towards said frame on the side of said bearings opposite said abutments and having close running clearance with the mouths of said cavities, the space between said abutments and the bottoms of said cavities acting as a closed lubricant reservoir for said bearings, one of said cavities having an aperture in the bottom thereof through which the end of said shaft extends, and a thick felt-like washer in the bottom of said one cavity positioned against the wall thereof and fitting around said shaft.

8. In combination; a frame comprising spaced end parts and each having walls forming cavities therein facing each other, a shaft extending between said cavities, anti-friction bearings on said shaft in each of said cavities, abutments in the walls of said cavities, shims placed between the bearings and abutments thereby axially positioning said shaft, and slingers comprising disc washers on said shaft rotatably secured in contact with said bearings and said abutment between the same and extending radially towards said frame on the side of said bearings opposite said abutments and having close running clearance with the mouths of said cavities, the space between said abutments and the bottoms of said cavities acting as a closed lubricant reservoir for said bearings, one of said cavities having an aperture in the bottom thereof through which the end of said shaft extends, a thick felt-like washer in the bottom of said one cavity positioned against the wall thereof and closely fitting around said shaft, and a stiff washer press fitted into the said cavity to retain the felt-like washer therein and having substantial clearance around said shaft.

STEFFEN S. BROWN.

REFERENCES CITED

The following references are of record in the file of this patent:

UNITED STATES PATENTS

| Number | Name | Date |
|---|---|---|
| 1,157,945 | Levin | Oct. 26, 1915 |
| 1,174,598 | Mix | Mar. 7, 1916 |
| 1,447,856 | Johnson | Mar. 6, 1923 |
| 1,577,725 | Jones | Mar. 23, 1926 |
| 1,708,710 | Vincent | Apr. 9, 1929 |
| 1,736,426 | Bond | Nov. 19, 1929 |
| 1,918,988 | Searles | July 18, 1933 |
| 1,973,047 | Brown | Sept. 11, 1934 |
| 2,003,000 | Kelpe | May 28, 1935 |

FOREIGN PATENTS

| Number | Country | Date |
|---|---|---|
| 231,311 | Switzerland | June 1, 1944 |